Patented Aug. 11, 1931

1,818,212

UNITED STATES PATENT OFFICE

ALBERT K. EPSTEIN AND BENJAMIN R. HARRIS, OF CHICAGO, ILLINOIS

EGG WHITE PROCESS

No Drawing.   Application filed August 8, 1929.   Serial No. 384,469.

Our invention relates to an improved process for making dried egg whites, and has to do with the improved product resulting from such process.

A considerable industry has been developed in the production of dried whites, principally because many food products make use only of egg yolk while other food products make use only of egg white. Now it has been customary for some time to dry the egg whites in order better to preserve them, etc.; but it has been found that if the egg whites are treated in certain ways during the drying treatment better foaming qualities are obtained when the whites are afterward incorporated in an aqueous medium and subjected to beating.

Before considering the processes used heretofore it may be stated that egg white contains approximately 87% to 88% of moisture and from 12% to 13% of solids. The solids consist of protein materials with a very small amount of ash (less than 1%) and reducing sugar material varying from .4% to .5%. This liquid egg white material is strongly alkaline in reaction when separated from the yolk, reacting alkaline both with respect to phenolphthalein and litmus indicators.

Now as to the old process, the egg whites were either dried immediately to avoid the possibility of bio-chemical change, or they were allowed to age before drying. It was discovered that when aged the bio-chemical changes which would result would produce a finished product having superior beating qualities to natural fresh egg whites and very much better foaming value than egg whites which were dried without ripening, as the quick drying of egg whites seems actually to decrease the foaming qualities. Inasmuch as the egg whites are of value principally for their beating qualities this ripening process has been used even though the dried egg whites produced thereby have a putrid odor. This odor is offensive and is caused by various nitrogen protein materials undergoing deep seated cleavage or proteolysis resulting in a decomposition of such protein materials.

The principal object of our invention is to produce a dried egg white which will have good foaming qualities and at the same time avoid all traces of putrid odors.

Another object is to produce a dried egg white embodying the best features of egg whites produced according to the two processes outlined above, but avoiding the objectionable characteristics of egg whites produced according to such processes.

In accomplishing our invention we have found that by controlling the ripening process in a certain definite way we can obtain an increased colloidal dispersion of the various albuminous materials and obtain a resultant product with a larger and better beating value than fresh liquid egg whites, or fresh liquid egg whites dried in the natural state without ripening. Our process will eliminate or reduce the amount of putrefactive substances present in the egg white thereby producing a product with a better odor and taste.

It will be recalled that in the old process the ripening was allowed to continue an indeterminate length of time but in general the product was acid both to phenolphthalein and litmus. We have discovered that putrefactive odors are avoided if the process is controlled so that the finished product will not be acid to litmus. As a control we continue the ripening to a point where the egg whites are substantially neutral to phenolphthalein, that is they can be faintly alkaline or even slightly acid but still be substantially alkaline to litmus. When the egg whites have been ripened to this point they are deprived of their moisture by drying and the resulting dry product has excellent foaming value and a good odor.

In order to school those skilled in the art with the details of our invention it may be stated that in actual practice we take sound edible eggs which have been candled to discard those which are unsatisfactory for food, open them and separate the yolk from the whites. The liquid whites which of course should be free of yolk or shell material, are poured into containers or large tanks and allowed to remain at ordinary room temperature for from 48 to 60 hours or until by periodic tests the product is found to be approximately neutral to phenolphthalein. With ordinary drying processes the process can be carried on until the product is slightly acid to phenolphthalein, the best results appearing to take place when ripening has progressed to such an extent that 25 c. c.'s of the product will be neutralized to phenolphthalein by from 1 to 2 c. c.'s of normal sodium hydroxide solution. The reason why it is preferred to stop the ripening at this point is that the time of drying in ordinary commercial processes cannot be determined with great exactness as the humidity of the air, etc. cannot be controlled with exactness on a commercial scale, and further ripening may proceed during the drying process. This is expected but should not take place to such an extent that the final product will be acid to litmus and will be putrid.

At this point in the ripening the liquid eggs will be thinner in consistency and will have a slightly sour odor, but not putrid. In drying the liquid product may be spread out in thin layers and a warm current of air passed over it until the product becomes dry and crumbly. Care must be taken in the regulation of the temperature of the drying air, about forty to forty-five degrees centigrade being good but temperature slightly higher than this may cause coagulation. This drying step generally takes from 26 to 30 hours depending upon atmospheric conditions, the thickness of the layers, temperature of the air, the rate at which blown, etc. The trays used are generally ½ inch to ¾ inch deep but the egg whites may be spread out to any thickness desired. They may also be dried on a drum in the form of very thin films in which case the drying takes place more quickly and the original ripening step may be carried on slightly further, but still not far enough to show any acid reaction to litmus.

The process has to do principally with the treatment of liquid eggs, but of course it may be employed for the treatment of egg whites which previously have been frozen or kept in a frozen condition for a considerable length of time and then thawed out. Neither do we limit our invention to any specific method of drying. Details of ripening, drying, etc. have been disclosed for the instruction of those skilled in the art but the invention including the process and product is limited only by the scope of the appended claims.

What we claim as new and desire to protect by United States Letters Patent is:

1. A process for drying egg whites which includes the steps of ripening liquid egg whites to a point at which they are substantially neutral or slightly acid to phenolphthalein, but arresting the ripening action before the egg whites become acid to litmus.

2. A process for producing dried egg whites having improved foaming properties when subsequently liquefied, which comprises increasing the colloidal dispersion of the albuminous materials by fermentation at room temperature for a period of forty-eight to sixty hours, arresting the fermentation before the fermentation has progressed to a point where putrid odors are present, and finally driving the free moisture from the liquid whites until a dried product is formed.

In witness whereof, we hereunto subscribe our names this 17th day of July, 1929.

ALBERT K. EPSTEIN.
BENJAMIN R. HARRIS.